No. 805,647. PATENTED NOV. 28, 1905.
W. H. JACKSON.
SPRING WHEEL.
APPLICATION FILED JULY 15, 1904.
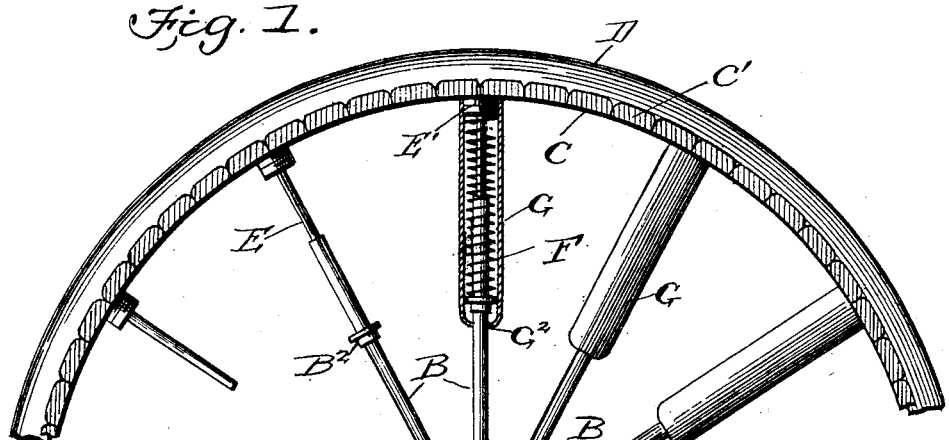
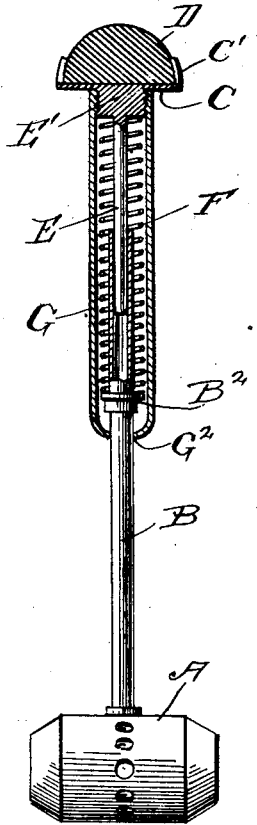
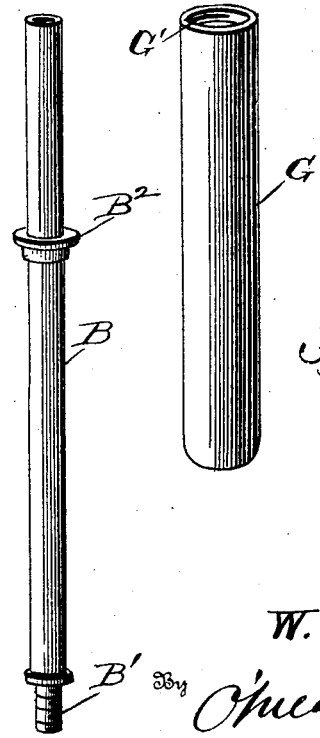
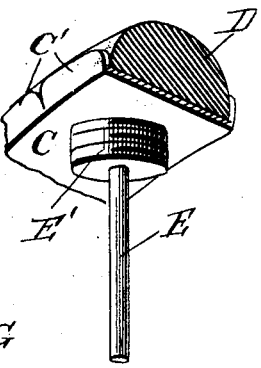
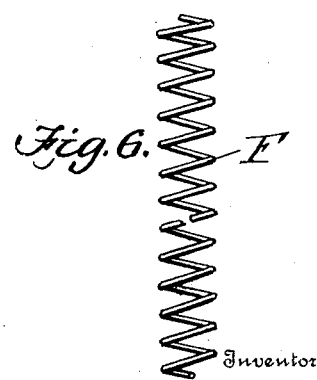
Witnesses
M. Blondel
E. B. McBath
Inventor
W. H. Jackson,
By Sheard Brock
Attorney

UNITED STATES PATENT OFFICE.

WILLIAM H. JACKSON, OF BAKERSFIELD, CALIFORNIA.

SPRING-WHEEL.

No. 805,647.  Specification of Letters Patent.  Patented Nov. 28, 1905.

Application filed July 15, 1904. Serial No. 216,735.

*To all whom it may concern:*

Be it known that I, WILLIAM H. JACKSON, a citizen of the United States, residing at Bakersfield, in the county of Kern and State of California, have invented a new and useful Spring-Spoke for Vehicle-Wheels, of which the following is a specification.

This invention relates generally to vehicle-wheels, and more particularly to the construction and arrangement of a spring-spoke forming a part thereof and by means of which a certain amount of yielding motion or elasticity is obtained between the rim and hub and by means of which a cushioned tire is made to ride as easy as a pneumatic tire.

The invention consists in the novel features of construction and combination of parts hereinafter fully described, and pointed out in the claims.

In the drawings forming a part of this specification, Figure 1 is a detail elevation, partly in section and disclosing all the features of my invention. Fig. 2 is a detail view of one of the spokes, the rim and tire being shown in section and the hub in elevation. Fig. 3 is a detail perspective view of one of the tubular sections of the spoke. Fig. 4 is a detail perspective view of the protecting-sleeve, and Fig. 5 is a detail perspective view showing the solid portion of the spoke and the adjacent portion of the rim and tire. Fig. 6 is a detail view of the spring.

In carrying out my invention I employ an ordinary hub A, to which the tubular spoke-section B is attached, the inner end of said spoke-section being threaded, as shown at B', and screwed into the hub.

C indicates a flexible metal rim having the outwardly-extending gripping members C', which are adapted to grasp and hold the cushion-tire D, preferably of rubber.

E indicates the solid spoke-section, which is rigidly connected to the rim C and has a threaded head E' at the juncture of the rim and spoke. The solid spoke-sections are adapted to fit into the tubular spoke-sections, as most clearly shown in Fig. 2, and a coil-spring F surrounds the solid portion E and the outer portion of the tubular section B, said spring bearing at its outer end against the threaded head E' and at its inner end against the collar $B^2$, arranged upon the tubular section B, and the joint between spoke-sections and the spring are enveloped by means of a sleeve G, threaded at its upper end, as shown at G', and adapted to be attached to the threaded head E', said sleeve having an opening $G^2$ at its inner end through which the tubular section B passes.

By means of the construction herein shown and described it is obvious that there will be a limited amount of yielding movement or elasticity between the rim and hub, as the solid section of the spoke will telescope or slide into the hollow section and the spring F will take up the strain, the sleeve sliding upon the tubular spoke-section at the same time the solid spoke-section slides therein. This sleeve thoroughly protects the operative parts and prevents the accumulation of dust, dirt, snow, or ice interfering with the operation of the device.

Having thus fully described my invention, what I claim as new, and desire to secure by Letters Patent, is—

1. A wheel comprising a hub, radial tubular spokes carried by the hub, a rim, spokes carried by the rim and having their inner end portions loosely working in the tubular spokes, a coil-spring encircling the point of juncture of the hub and rim spokes, respectively, and a sleeve inclosing the said spring.

2. A spring vehicle-wheel comprising the hub and rim, and a series of sectional telescopic spokes, each spoke consisting of a tubular section secured to the hub, a solid section secured to the rim, and having a threaded head at its outer end, a collar arranged upon the tubular section, a spiral spring surrounding the joint of the sections, and bearing against the collar and the threaded head, and the sleeve threaded at its outer end and adapted to be secured upon the threaded head, said sleeve having an opening at its inner end through which the tubular section passes.

3. A spring vehicle-wheel comprising in combination a hub, a rim having outwardly-projecting members, a cushion-tire secured by said members, the tubular spoke-sections secured to the hub, and having collars, the solid spoke-sections secured to the rim, and provided with threaded heads, the spiral springs surrounding the spoke-sections, between the heads and collars, and the sleeves secured to the heads and enveloping the springs, said sleeves having openings at their inner ends through which the tubular spoke-sections pass, all of said parts being constructed, arranged and adapted to operate substantially as shown and described.

WILLIAM H. JACKSON.

Witnesses:
C. M. HIGGINS,
R. PILE.